(No Model.)
B. K. MOSCOPOULOS.
FISHING NET.
No. 326,139. Patented Sept. 15, 1885.
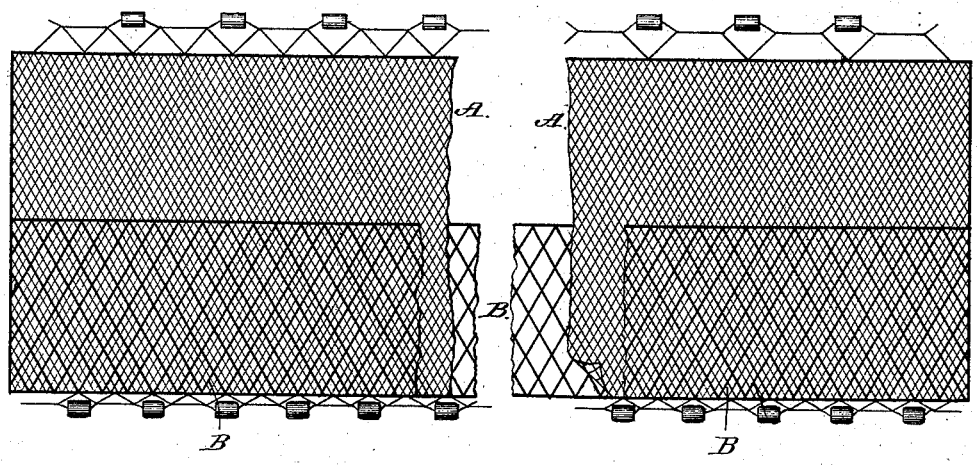
Attest:
John A. Ellis
A. B. Moore.
Inventor:
Basilios K. Moscopoulos
By David A. Burr
Atty.

UNITED STATES PATENT OFFICE.

BASILIOS K. MOSCOPOULOS, OF NEW YORK, N. Y.

FISHING-NET.

SPECIFICATION forming part of Letters Patent No. 326,139, dated September 15, 1885.

Application filed January 23, 1885. (No model.)

*To all whom it may concern:*

Be it known that I, BASILIOS K. MOSCOPOULOS, of the city, county, and State of New York, have invented a new and useful Improvement in Fishing-Nets; and I do hereby declare that the following is a full and exact description thereof, reference being had to the accompanying drawings, and to the letters of reference marked thereon, making a part of this specification.

My invention relates to compound fishing-nets or seines, and has for its object the construction of a net which shall be especially adapted for fishing in deep waters to catch fishes of all sizes both in the depth and at the surface.

Ordinarily the nets, when made with meshes small enough to catch and hold small fish, will not trap the larger ones. These last simply strike the net, and as their heads do not pass into its meshes, they are turned aside therefrom without engagement therewith. Where the net is made open enough to catch these large fishes the smaller ones pass readily through its meshes and escape.

A compound net has heretofore been made and patented, March 28, 1882, No. 255,671, for the purpose of more effectually catching large fishes by placing a fine gill-net centrally between two outer coarser nets to form pockets on each side and re-enforce the central net; but such a net is adapted for use in catching the large fish frequenting the deeper waters only, and if made long enough to extend from the surface to the bottom becomes heavy and clumsy, and is impracticable.

My invention provides a net adapted for deep-water fishing, and which is constructed to catch not only the large fish near the bottom, but also the small fish nearer the surface, and admits of being readily set and handled.

A in the drawing represents my improved net made throughout in the customary manner with fine meshes small enough to catch and hold the smallest fishes which it is desired to secure. The fish swimming against the net pass their heads through its meshes and are caught therein by the gills.

B B represent nets of large mesh, through which fishes of a size too large to become entangled in the finer net A may pass their heads and become caught. The net A is alone made of a depth or width sufficient to extend from near the surface to near the bottom of the water, while the outer coarser nets B B are secured therein on each side thereof to extend from its bottom edge upward for a third or a half only of its entire width, as illustrated in the drawing.

In the use of the net the large fishes, which frequent the lower depths, strike against it, and find their advance barred by the central small netting, A. The fish instinctively turns aside therefrom; but as, in touching the net, its head has passed through the larger mesh of the outer section, B, its gills are, as it turns, at once caught by the net, and the fish is surely entangled and made fast. The smaller fish found near the surface are caught by the fine net, and if lower down pass readily through the larger meshes B, so as to be caught in the central net.

The one compound net thus serves equally well for securing both large and small fish without the disadvantage of being too heavy and cumbersome for use in deep water, as would be the case with a net formed throughout in three pieces.

I do not claim as new constructing a net in three sections consisting of a finer central net faced by two outer coarser nets; but

I claim as my invention—

The compound fishing-net constructed, substantially as herein described, of an upper division of single comparatively fine netting, in combination with a lower division consisting of a central section of fine netting faced on either side with coarser netting loosely attached thereto.

In testimony whereof I have signed my name to this specification in the presence of two subscribing witnesses.

B. K. MOSCOPOULOS.

Witnesses:
J. F. ACKER, Jr.,
G. H. SPENCER.